US007702882B2

(12) United States Patent
Wybenga et al.

(10) Patent No.: US 7,702,882 B2
(45) Date of Patent: Apr. 20, 2010

(54) APPARATUS AND METHOD FOR PERFORMING HIGH-SPEED LOOKUPS IN A ROUTING TABLE

(75) Inventors: Jack C. Wybenga, Plano, TX (US); Patricia K. Sturm, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 716 days.

(21) Appl. No.: 10/658,977

(22) Filed: Sep. 10, 2003

(65) Prior Publication Data

US 2005/0055457 A1 Mar. 10, 2005

(51) Int. Cl.
*G06F 12/00* (2006.01)
(52) U.S. Cl. ........................ 711/220; 711/169
(58) Field of Classification Search .......... None
See application file for complete search history.

(56) References Cited

U.S. PATENT DOCUMENTS

| | | | |
|---|---|---|---|
| 5,471,593 A | 11/1995 | Branigin | |
| 5,781,772 A | 7/1998 | Wilkinson, III et al. | |
| 5,857,196 A | 1/1999 | Angle et al. | |
| 6,011,795 A | 1/2000 | Varghese et al. | |
| 6,014,659 A | 1/2000 | Wilkinson, III et al. | |
| 6,067,574 A | 5/2000 | Tzeng | |
| 6,079,006 A | 6/2000 | Pickett | |
| 6,178,135 B1 | 1/2001 | Kang | |
| 6,192,051 B1 * | 2/2001 | Lipman et al. | 370/389 |
| 6,209,020 B1 | 3/2001 | Angle et al. | |
| 6,212,184 B1 | 4/2001 | Venkatachary et al. | |
| 6,275,927 B2 | 8/2001 | Roberts | |
| 6,385,649 B1 | 5/2002 | Draves et al. | |
| 6,430,527 B1 | 8/2002 | Waters et al. | |
| 6,522,632 B1 | 2/2003 | Waters et al. | |
| 6,560,610 B1 | 5/2003 | Eatherton et al. | |
| 6,571,313 B1 | 5/2003 | Filippi et al. | |

(Continued)

FOREIGN PATENT DOCUMENTS

EP 0 408 188 A2 1/1991

(Continued)

OTHER PUBLICATIONS

Masami Shishibori, et al., "A Key Search Algorithm Using the Compact Patricia Trie", Oct. 1997, 1997 IEEE International Conference on Intelligent Processing Systems, pp. 1581-1584.

(Continued)

*Primary Examiner*—Brian R Peugh

(57) ABSTRACT

A lookup circuit for translating received addresses into destination addresses. The lookup circuit comprises M pipelined memory circuits for storing a trie table for translating a first received address into a first destination address. The M memory circuits are pipelined such that a first portion of the first received address accesses an address table in a first memory circuit. An output of the first memory circuit comprises a first address pointer that indexes a start of an address table in a second memory circuit. The first address pointer and a second portion of the first received address access a particular entry in the address table in the second memory circuit. An output of the second memory circuit comprises a second address pointer that indexes a start of an address table in the third memory circuit, and so forth.

20 Claims, 4 Drawing Sheets

U.S. PATENT DOCUMENTS

| | | |
|---|---|---|
| 6,581,106 B1 | 6/2003 | Crescenzi et al. |
| 6,614,789 B1 | 9/2003 | Yazdani et al. |
| 6,631,419 B1 | 10/2003 | Greene |
| 6,691,124 B2 | 2/2004 | Gupta et al. |
| 6,691,171 B1 | 2/2004 | Liao |
| 6,697,363 B1 | 2/2004 | Carr |
| 6,711,153 B1 | 3/2004 | Hebb et al. |
| 6,728,732 B1 | 4/2004 | Eatherton et al. |
| 6,731,644 B1 | 5/2004 | Epps et al. |
| 6,772,268 B1 | 8/2004 | Kristiansen et al. |
| 6,782,382 B2 | 8/2004 | Lunteren |
| 6,798,777 B1 * | 9/2004 | Ferguson et al. ............ 370/392 |
| 6,839,830 B2 | 1/2005 | Liu |
| 6,859,455 B1 | 2/2005 | Yazdani et al. |
| 6,888,838 B1 | 5/2005 | Ji et al. |
| 6,928,430 B1 | 8/2005 | Chien et al. |
| 6,934,252 B2 | 8/2005 | Mehrotra et al. |
| 6,952,401 B1 * | 10/2005 | Kadambi et al. ............ 370/232 |
| 7,017,021 B2 | 3/2006 | Gupta et al. |
| 7,058,725 B2 | 6/2006 | Mathew et al. |
| 7,099,881 B2 | 8/2006 | Richardson et al. |
| 7,162,481 B2 | 1/2007 | Richardson et al. |
| 2002/0146009 A1 | 10/2002 | Gupta et al. |
| 2002/0147721 A1 | 10/2002 | Gupta et al. |
| 2002/0159466 A1 | 10/2002 | Rhoades |
| 2003/0126233 A1 * | 7/2003 | Bryers et al. ................ 709/219 |
| 2003/0174717 A1 | 9/2003 | Zabarski et al. |
| 2003/0236968 A1 | 12/2003 | Basu et al. |
| 2004/0054807 A1 * | 3/2004 | Harvey et al. ............... 709/243 |
| 2004/0100960 A1 | 5/2004 | Mehta |
| 2004/0105442 A1 | 6/2004 | Ko et al. |
| 2004/0107295 A1 | 6/2004 | Herkersdorf et al. |
| 2004/0109451 A1 | 6/2004 | Huang et al. |
| 2004/0111395 A1 | 6/2004 | Rajgopal et al. |
| 2004/0114587 A1 * | 6/2004 | Huang et al. ................ 370/389 |
| 2005/0055339 A1 | 3/2005 | Richardson |
| 2006/0101130 A1 | 5/2006 | Adams et al. |

FOREIGN PATENT DOCUMENTS

| | | |
|---|---|---|
| EP | 1 168 723 A2 | 1/2002 |
| WO | WO 98/41931 A1 | 9/1998 |
| WO | WO 01/63852 A1 | 8/2001 |

OTHER PUBLICATIONS

Miguel A. Ruiz-Sanchez, et al., "Survey and Taxonomy of IP Address Lookup Algorithms", IEEE Network, Mar./Apr. 2001, p. 8-23.

Stefan Nilsson, et al., "IP-Address Lookup Using LC-Tries", IEEE Journal on Selected Areas in Communications, IEEE Inc., Jun. 1999, pp. 1083-1092, vol. 17, No. 6, New York, U.S.

Andreas Moestedt, et al., "IP Address Lookup in Hardware for High-Speed Routing," IEEE Hot Interconnects VI, Aug. 1998, pp. 31-39.

K.J. Christensen, et al., "Local area network-Evolving from shared to switched access," IBM Systems Journal, vol. 34, No. 3, 1995, p. 1-9.

European Search Report dated Dec. 10, 2007 issued in connection with European Patent Application No. EP 03 25 7666.

Mikael Degermark, et al., "Small Forwarding Tables for Fast Routing Lookups", 1997 ACM, p. 3-14.

Butler Lampson, et al., "IP Lookups Using Multiway and Multicolumn Search", IEEE/ACM Transactions on Networking, vol. 7, No. 3, Jun. 1999, p. 324-334.

Henry Hong-Yi Tzeng, et al., "On Fast Address-Lookup Algorithms", IEEE Journal on Selected Areas in Communications, vol. 17, No. 6, Jun. 1999, p. 1067-1082.

* cited by examiner

APPARATUS AND METHOD FOR PERFORMING HIGH-SPEED LOOKUPS IN A ROUTING TABLE

TECHNICAL FIELD OF THE INVENTION

The present invention relates to massively parallel routers and, more specifically, to a massively parallel, distributed architecture router that contains a routing (or forwarding) lookup mechanism capable of performing high-speed lookups.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers. Increasingly, routers are the cause of major bottlenecks in the Internet.

The limitations of conventional routers have been at least partially overcome by the introduction of massively parallel, distributed architecture routers. The use of optical connections has also greatly increased throughput. However, even massively parallel, distributed architecture routers have problems caused in part by the use of routing tables (or forwarding tables) that perform address translation lookups, among other things. Line speeds are increasing faster than processing speeds that perform routing table lookups. Since route lookups require the longest prefix match, this is a non-trivial problem. Internet Protocol Version 6 (IPv6) has aggravated this problem, because IPv6 uses 128-bit addresses, compared to the 32-bit addresses used in IPv4. Adding Type of Service (TOS) and Layer 4 addressing fields into the lookup value makes the problem still worse.

Routing tables with a million entries are not uncommon. Some lookup schemes (e.g., hashing, digital trees) are able to reduce the search time, but the large number of routing table entries leads to memory problems. It is prohibitively expensive and technically difficult to incorporate enough high-speed memory to support fairly flat search tables. As the number of memory chips increases, maintaining high performance becomes difficult due to layout considerations. As a result, memory access times are too slow to permit very deep search tables.

Some proposals use ternary content addressable memory (TCAM) devices to increase lookup speeds, but these devices are impractical due to expense and power consumption. Placing enough TCAMs on a circuit card to handle forwarding table lookups up to 144 bits wide, with up to a million entries, is prohibitive in both respects. Hashing and state-of-the-art search techniques are not adequate to keep routing tables within a reasonable size for cost and performance considerations and to keep the number of lookup stages low enough that memory access times enable lookups to keep up with line speeds. Thus, there is no practical method for doing IPv6 lookups at line speed for high-speed interfaces.

Therefore, there is a need in the art for an improved high-speed router. In particular, there is a need for an improved routing (forwarding) lookup mechanism that can perform lookups at line speed for a high-speed interface.

SUMMARY OF THE INVENTION

The present invention provides an apparatus for performing IPv4 and IPv6 routing table lookups at line speeds of 10 gigabits per second (Gbps) and higher. IPv4 lookups of 50 bits enable forwarding based on 32 bits of Layer 3 IP address, 12 bits of Layer 4 address (sockets), and 6 bits of TOS. IPv6 lookups of 144 bits enable forwarding based on 128 bits of Layer 3 address and up to 16 bits of Layer 4 addressing and TOS.

The present invention uses a combination of hashing, digital search trees, and pipelining to achieve the goals of line speed routing table lookup operations in lookup tables containing up to one million entries. Advantageously, the present invention may be implemented with relatively low cost parts. A key aspect of the present invention is the use of a trie-based scheme to keep the size of the lookup structures within the practical limits of high-speed SRAM. Only the final stage of the route lookup must reside in low-speed DRAM. A pipelined hardware lookup scheme achieves the high throughput.

To address the above-discussed deficiencies of the prior art, it is a primary object of the present invention to provide, for use in a router, a lookup circuit for translating received addresses into destination addresses. According to an advantageous embodiment, the lookup circuit comprises M pipelined memory circuits for storing a trie table capable of translating a first received address into a first destination address. The M memory circuits are pipelined such that a first portion of the first received address accesses an address table in a first memory circuit and an output of the first memory circuit accesses an address table in a second memory circuit.

According to one embodiment of the present invention, the output of the first memory circuit comprises a first address pointer that indexes a start of the address table in the second memory circuit.

According to another embodiment of the present invention, the first address pointer and a second portion of the first received address access the address table in the second memory circuit.

According to still another embodiment of the present invention, an output of the second memory circuit accesses an address table in a third memory circuit.

According to yet another embodiment of the present invention, the output of the second memory circuit comprises a second address pointer that indexes a start of the address table in the third memory circuit.

According to a further embodiment of the present invention, address pointers output from the M pipelined memory circuits are selectively applied to a final memory circuit storing a routing table, the routing table comprising a plurality of destination addresses associated with the received addresses.

According to a still further embodiment of the present invention, the lookup circuit further comprises a memory interface capable of selectively applying to the final memory circuit an address pointer associated with the first received address and an address pointer associated with a subsequently received address, such that the address pointer associated with the first received address is applied to the final memory circuit prior to the address pointer associated with the subsequently received address.

According to a yet further embodiment of the present invention, the M pipelined memory circuits comprise static random access memory (SRAM) circuits and the final memory circuit comprises a dynamic random access memory (DRAM) circuit.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged distributed router.

Figure 1:
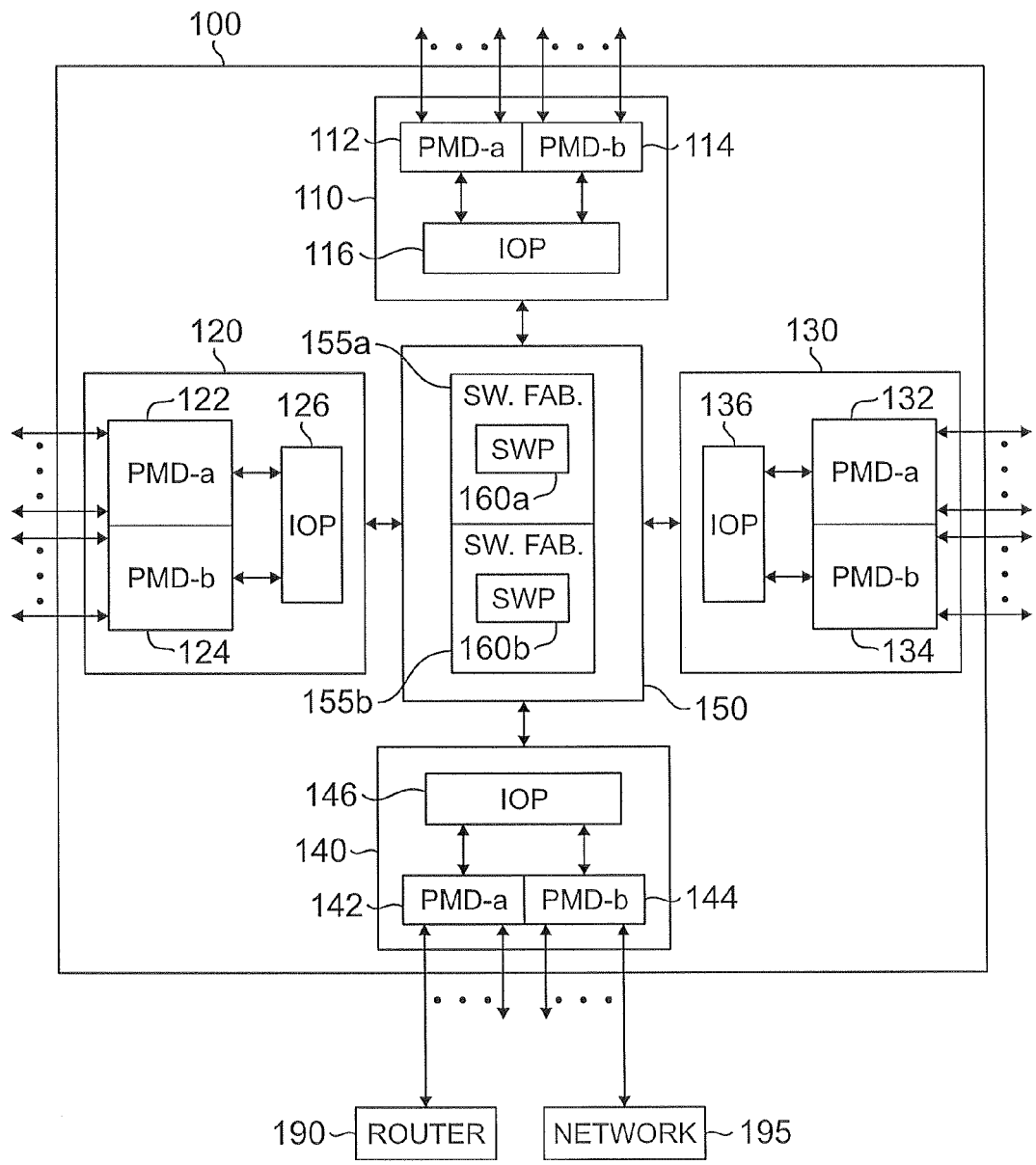
FIG. 1 illustrates a distributed architecture router that implements a fast lookup forwarding table according to the principles of the present invention.

FIG. 1 illustrates exemplary distributed architecture router 100, which implements a fast lookup forwarding table according to the principles of the present invention. Distributed architecture router 100 provides scalability and high-performance using up to N independent routing nodes (RN), including exemplary routing nodes 110, 120, 130 and 140, connected by switch 150, which comprises a pair of high-speed switch fabrics 155a and 155b. Each routing node comprises an input-output processor (IOP) module, and one or more physical medium device (PMD) module. Exemplary RN 110 comprises PMD module 112 (labeled PMD-a), PMD module 114 (labeled PMD-b), and IOP module 116. RN 120 comprises PMD module 122 (labeled PMD-a), PMD module 124 (labeled PMD-b), and IOP module 126. RN 130 comprises PMD module 132 (labeled PMD-a), PMD module 134 (labeled PMD-b), and IOP module 136. Finally, exemplary RN 140 comprises PMD module 142 (labeled PMD-a), PMD module 144 (labeled PMD-b), and IOP module 146.

Each one of IOP modules 116, 126, 136 and 146 buffers incoming Internet protocol (IP) frames and MPLS frames from subnets or adjacent routers, such as router 190 and network 195. Additionally, each of IOP modules 116, 126, 136 and 146 classifies requested services, looks up destination addresses from frame headers or data fields, and forwards frames to the outbound IOP module. Moreover, each IOP module also maintains an internal routing table determined from routing protocol messages and provisioned static routes and computes the optimal data paths from the routing table. Each IOP module processes an incoming frame from one of its PMD modules. According to one embodiment of the present invention, each PMD module encapsulates an incoming frame (or cell) from an IP network (or ATM switch) for processing in an IOP module and performs bus conversion functions.

Each one of routing nodes 110, 120, 130, and 140, configured with an IOP module and PMD module(s) and linked by switch fabrics 155a and 155b, is essentially equivalent to a router by itself. Thus, distributed architecture router 100 can be considered a set of RN building blocks with high-speed links (i.e., switch fabrics 155a and 155b) connected to each block. Switch fabrics 155a and 155b support frame switching between IOP modules. Switch processor (SWP) 160a and switch processor (SWP) 160b, located in switch fabrics 155a and 155b, respectively, support system management.

Unlike a traditional router, distributed architecture router 100 requires an efficient mechanism of monitoring the activity (or "aliveness") of each routing node 110, 120, 130, and 140. Distributed architecture router 100 implements a routing coordination protocol (called "loosely-coupled unified environment (LUE) protocol") that enables all of the independent routing nodes to act as a single router by maintaining a consistent link-state database for each routing node. The loosely-unified environment (LUE) protocol is based on the design concept of OSPF (Open Shortest Path First) routing protocol and is executed in parallel by daemons in each one of RN 110, 120, 130, and 140 and in SWP 160a and SWP 160b to distribute and synchronize routing tables. As is well known, a daemon is an agent program that continuously operates on a processing node and provides resources to client systems. Daemons are background processes used as utility functions.

Figure 2:
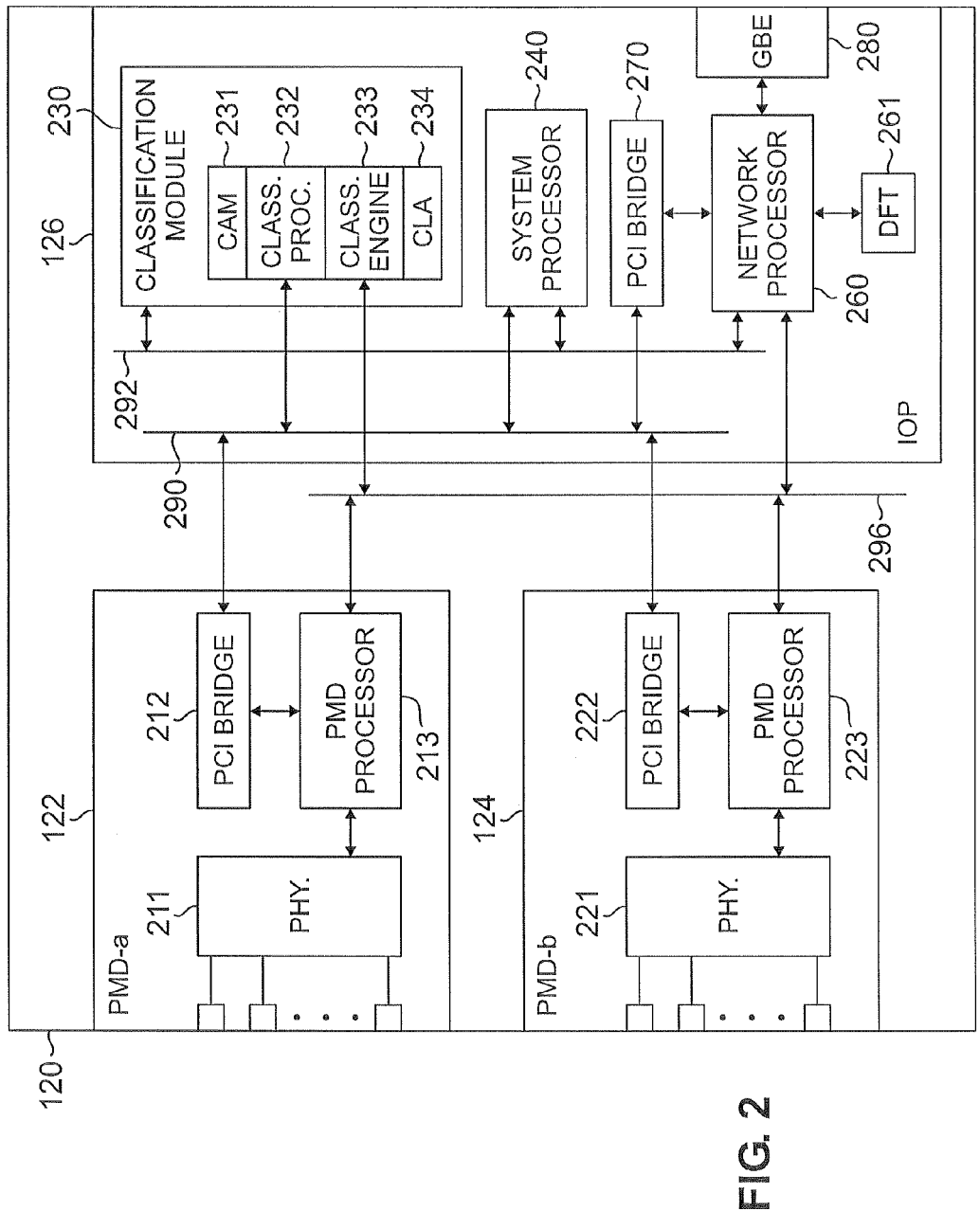
FIG. 2 illustrates selected portions of an exemplary routing node in the distributed architecture router in FIG. 1 according to one embodiment of the present invention.

FIG. 2 illustrates selected portions of exemplary routing node 120 in distributed architecture router 100 according to one embodiment of the present invention. Router 100 shares routing information in the form of aggregated routes among the routing engines. The routing engines are interconnected through Gigabit optical links to the switch modules (SWMs). Multiple SWMs can be interconnected through 10 Gbps links. Classification module 230 is an optional daughter card that may be inserted on any or all IOP modules. Ingress data can be sent to classification modules 230 to enable, for example, IPv6 tunneling through router 100, streams-based billing, subnet independent NAT, Layers 4-7 and QoS-based forwarding, data filtering and blocking for firewall functionality, and data surveillance, among other functions.

Routing node 120 comprises physical medium device (PMD) module 122, physical medium device (PMD) module 124 and input-output processor module 126. PMD module 122 (labeled PMD-a) comprises physical layer circuitry 211, physical medium device (PMD) processor 213 (e.g., IXP 1240 processor), and peripheral component interconnect (PCI) bridge 212. PMD module 124 (labeled PMD-b) comprises physical layer circuitry 221, physical medium device (PMD) processor 223 (e.g., IXP 1240 processor), and peripheral component interconnect (PCI) bridge 222.

IOP module 126 comprises classification module 230, system processor 240 (e.g., MPC 8245 processor), network processor 260 (e.g., IXP 1200 or IXP 1240 processor), peripheral component interconnect (PCI) bridge 270, and Gigabit Ethernet connector 280. Classification module 230 comprises content addressable memory (CAM) 231, classification processor 232 (e.g., MPC 8245 processor), classification engine 233 and custom logic array (CLA) 234 (e.g., FPGA). Classification engine 233 is a state graph processor. Custom logic array 234 controls the flow of the packet within classification module 230 and between classification module 230 and network processor 260. PCI bus 290 connects PCI bridges 212, 222 and 270, classification processor 232, and system processor 240 for control plane data exchange such as route distribution. IX bus 296 interconnects PMD processor 213, PMD processor 223, and network processor 260 for data plane traffic flow. Local bus 292 interconnects classification module 230 and network processor 260 for data plane traffic flow.

Network processor 260 comprises microengines that perform frame forwarding and a control plane processor. Network processor 260 uses distributed forwarding table (DFT) 261 to perform forwarding table lookup operations. The network processor (e.g., network processor 260) in each IOP module (e.g., IOP module 126) performs frame forwarding using a distributed forwarding table (e.g., DFT 261).

As the foregoing description illustrates, router 100 contains a number of routing (forwarding) tables that translate IPv4 and IPv6 prefixes into destination addresses. As the line speeds of router 100 increase to the 10 gigabit per second (Gbps) range, such as in an OC-192c optical link, the lookup speeds of the routing tables are required to be very fast. The lookup speed is limited in part by the length of the longest matching prefix of an IPv4 or and IPv6 address.

A number of approaches have been used to search for the longest matching prefixes. Most approaches use one of two methods: 1) a search tree method; or a 2) search trie method. A search tree checks the value of the entry with the median value of each sub-tree. If the value is less than the median value, it is directed to the left half of the sub-tree and if it is larger, it is pointed to the right half.

A search trie uses a "thumb indexing" method, as in a dictionary. Each bit in the address is checked and a Logic 0 points to the left half of the sub-tree and a Logic 0 points to the right half of the subtree. The trie is traversed until a leaf node is reached which determines the longest matching prefix. In the worst case, the number of memory accesses required for these schemes to determine the longest matching prefix equals the depth, D given by:

$$D = (\text{Address Bits})/\log_2(M), \quad [\text{Eqn. 1}]$$

where M is the degree of the trie (i.e., the number of ways to branch at each stage of the lookup) and $\log_2(M)$ is the number of bits consumed in each stage of the lookup. Most trie-based schemes attempt to reduce the number of memory accesses by reducing the trie depth.

Router 100 meets the requirements imposed by high line speeds by implementing a trie-based memory architecture that includes pipelined memory stages that perform very fast lookups. A final stage is a dynamic random access memory (DRAM) circuit that contains the routing table entries. The preceding pipeline stages are made from very fast static random access memory (SRAM) circuits that contain address pointers that index into subsequent pipeline stages or into the routing tables entries in the final DRAM stage.

The expected SRAM memory (bits/entry) of a trie for n random uniformly distributed entries is given by:

$$E(\text{Mem}(\text{Bits}/\text{Entry})) = M/\ln(M), \quad [\text{Eqn. 2}]$$

where M is the degree of the trie structure.

It is possible to calculate the maximum SRAM requirement and the expected SRAM requirement for different degrees of the trie. The maximum SRAM requirement arises from extreme cases that generally are not observed in conventional routing tables. It is further noted that the computed expected SRAM is less than that required for the actual routing tables. Therefore, the expected SRAM required is calculated and a scaling factor is used to allocate sufficient SRAM for the desired routing table size. The depth of the trie is also dependent on the degree of the trie. The depth of the trie determines the number of SRAM accesses.

The expected SRAM for a 64 degree trie is 15.39 bits per entry from Equation 2. This is approximately 16 megabits for a one million entry table. Using a scaling factor of 5 to provide sufficient space for actual IPv6 routing tables gives an SRAM requirement of approximately 80 megabits. Practical memory performance considerations for laying out circuit cards with 20 nanosecond memory chips give an expected SRAM limit of about 200 megabits. Two copies of the trie tables are maintained to allow seamless table updates. Thus, it is noted that a trie of degree 64 is near the 200 Mbit SRAM limit. This is a good indication that the degree of the trie structure should be no more than 64.

Suppose, as an example, that a 16 degree trie is proposed. The memory requirements to store a one million entry table are:

SRAM=5×6 Mbit=30 Mbit; and

DRAM=8×30 Mbit=240 Mbit.

Equation 2 gives 5.77 bits per entry for a 16 degree trie, hence approximately 6 Mbits for a million entry table. A scaling factor of 5 is used to provide sufficient space for actual IPv6 routing tables. For IPv4 routing tables, a scaling factor of 3 could be used. By assuming 8 bits for storing port numbers and noting that each trie entry may be a leaf, the DRAM requirement of 240 megabits is found.

The present invention starts by hashing a fixed number of bits to find the starting point for the trie table search for longest prefix match. The packet is classified using header information, such as type of service. The classification information and high order destination address bits are used for this hashing function. When classification bits are used, the length of the search increases and more stages of the lookup mechanism may be required.

According to an exemplary embodiment of the present invention, no classification is done and it is assumed that the IPv4 and IPv6 prefixes seen by the router are never shorter than 16 bits, so the first 16 bits can be hashed to provide the starting point for the trie table search for longest prefix match. Thus, the trie lookup is done on the remaining 16 bits for a 32-bit IPv4 address and on the remaining 112 bits for a 128-bit IPv6 address. From Equation 1, the depth of this 16 degree trie for IPv4 lookups is 4 and for IPv6 lookups is 28. If classification were done, more bits would be used and the depth of the IPv4 and IPv6 lookups would be greater.

With a minimum data packet size of 64 bytes and a usable throughput of 76% of bus bandwidth, a 1 Gigabit per second (Gbps) Ethernet interface can support approximately 1.5 million data packets per second. A rate of 1.5 million lookups per second corresponds to 666 nanoseconds for each data packet. Therefore, the time available for each SRAM level is equal to:

(666 ns)/(28 levels)=23.8 ns/level for the worst case IPv6 lookups. With an SRAM cycle time of 8 nanoseconds, each level can easily be searched in 23.8 ns. Such an implementation can even be done using off the shelf FPGA and SRAM chips. No pipelining is necessary for such an implementation. Large sizes can be implemented easily.

However, for a 10 Gbps Ethernet interface, the number of lookups per second increases to 15 million, leaving only 67/28=2.4 nanoseconds per lookup. This is not achievable with current SRAM circuits. Thus, a new approach is needed. The present invention provides this new approach by pipelining the lookup stages.

The maximum lookup rate that can be achieved by using a single RLDRAM is 40 million lookups per second or 25 nanoseconds per lookup. To get maximum throughput from such a scheme, one embodiment of the present invention may employ a 16 degree trie that has a depth of 4 levels for IPv4 and memory requirements of:

SRAM=3×6 Mbit=18 Mbit; and

DRAM=8×18 Mbit=144 Mbit.

A scaling factor of 3 is used for SRAM, which retains a reasonable SRAM size. For IPv6, a scaling factor of 5 is assumed. The scheme could easily be implemented using a four-stage on-chip pipeline and a final RLDRAM pipeline stage, as shown in FIG. 3.

Figure 3:
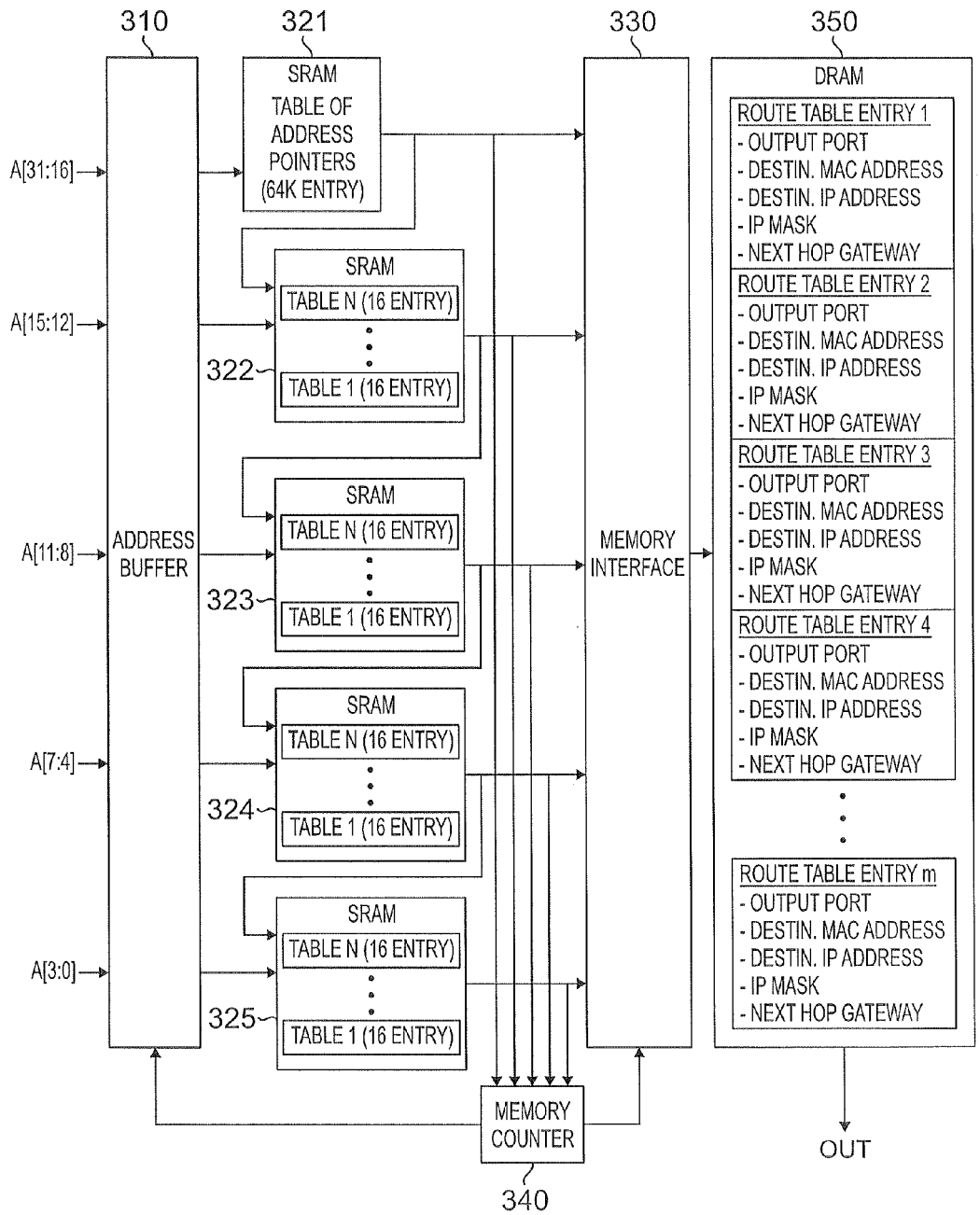
FIG. 3 illustrates a trie-based, pipelined routing table according to the principles of the present invention.

FIG. 3 illustrates a trie-based, pipelined routing table 300 according to the principles of the present invention. In one embodiment, routing table 300 may represent distributed forwarding table 261, for example. Four bits are consumed in each memory access in each pipeline stage. It is noted that more stages of pipelining are needed for IPv6. Routing table 300 comprises address buffer 310, static random access memory (SRAM) circuits 321-325, memory interface 330, memory controller 340, and dynamic random access memory (DRAM) circuit 350. SRAM circuits 321-325 contain address pointers that index into subsequent ones of the SRAM circuits in the pipeline or into the routing table entries in DRAM circuit 350.

Memory controller 340 controls the storing of addresses into address buffer 310 and controls the selective outputting of portions of each address in address buffer 310 to each one of SRAM circuits 321-325. Memory controller 340 also controls the storing of the outputs of SRAM circuit 321-325 into memory interface 330 and controls the selective outputting of addresses in memory interface 330 to DRAM circuit 350.

Address buffer 310 receives and buffers 32-bit IPv4 addresses. Each 32-bit address, A[31:0] is logically divided into a first 16-bit portion, A[31:16], and four other 4-bit portions, A[15:12], A[11:8], A[7:4], and A[3:0]. The address portions are applied to SRAM circuits 321-325 over five (5) sequential time slots. Address bits A[31:16] are applied to SRAM circuit 321 during a first time slot. The output of SRAM circuit 321 and address bits A[15:12] are applied to SRAM circuit 322 during a second time slot. The output of SRAM circuit 322 and address bits A[11:8] are applied to SRAM circuit 323 during a third time slot. The output of SRAM circuit 323 and address bits A[7:4] are applied to SRAM circuit 324 during a fourth time slot. The output of SRAM circuit 324 and address bits A[3:0] are applied to SRAM circuit 325 during a fifth time slot.

All subsequent addresses are applied in a similar manner to SRAM circuits 321-325. The subsequent addresses are also applied from address buffer 310 in a pipelined manner. Thus, during the second time slot, when address bits A[15:12] of a first sequential 32-bit address are being applied to SRAM circuit 322, the address bits A[31:16] of a second sequential 32-bit address are being applied to SRAM circuit 321. Then, during the third time slot, address bits A[11:8] of the first sequential 32-bit address are applied to SRAM circuit 323 at the same time that address bits A[15:12] of the second sequential 32-bit address are applied to SRAM circuit 322 and address bits A[31:16] of a third sequential 32-bit address are applied to SRAM circuit 321.

As noted above, it is assumed that router 100 does not see IPv4 prefixes shorter than 16 bits. Thus, the first sixteen address bits, A[31:16], are applied together to SRAM circuit 321. SRAM circuit 321 contains a table of address pointers having $2^{16}$ entries (i.e., 64K entry table). Each table entry contains an address pointer and a flag bit indicating whether or not the address translation is complete. If the IPv4 prefix is only 16 bits long, then the flag bit is set and the address pointer is latched into memory interface 330 in order to be applied to DRAM 350. If the IPv4 prefix is longer than 16 bits, then the flag is not set and the address pointer from SRAM circuit 321 is applied to SRAM circuit 322.

If smaller prefixes were seen (e.g., 8 bit prefixes), then the size of initial SRAM table 321 would decrease to $2^8$ entries and the number of stages in the lookup mechanism would increase by two. Use of classification bits could increase the size of SRAM 321 or increase the number of lookup stages.

SRAM circuit 322 contains a maximum of N tables, where N is determined by the size of the table in SRAM circuit 321. Each of the N tables in SRAM circuit 322 contains 16 entries. The start of each table is indexed by the address pointer from SRAM circuit 321. Address bits A[15:12] are used to select a particular one of the 16 entries in the table indexed by the address pointer from SRAM circuit 321.

Each of SRAM circuits 322-325 contains N tables that operate in a similar to the table of address pointers in SRAM circuit 321. For example, in SRAM circuit 322, each table entry contains an address pointer and a flag bit indicating whether or not the address translation is complete. If the IPv4 prefix is 20 bits long, then the flag bit is set and the address pointer from SRAM circuit 322 is latched into memory interface 330 in order to be applied to DRAM 350. If the IPv4 prefix is longer than 20 bits, then the flag is not set and the address pointer from SRAM circuit 322 is applied to SRAM circuit 323. This process continues through SRAM circuits 323, 324 and 325. Memory controller 340 detects when a flag bit is set after each SRAM stage and controls the latching of the address pointer into memory interface 330.

Figure 4:
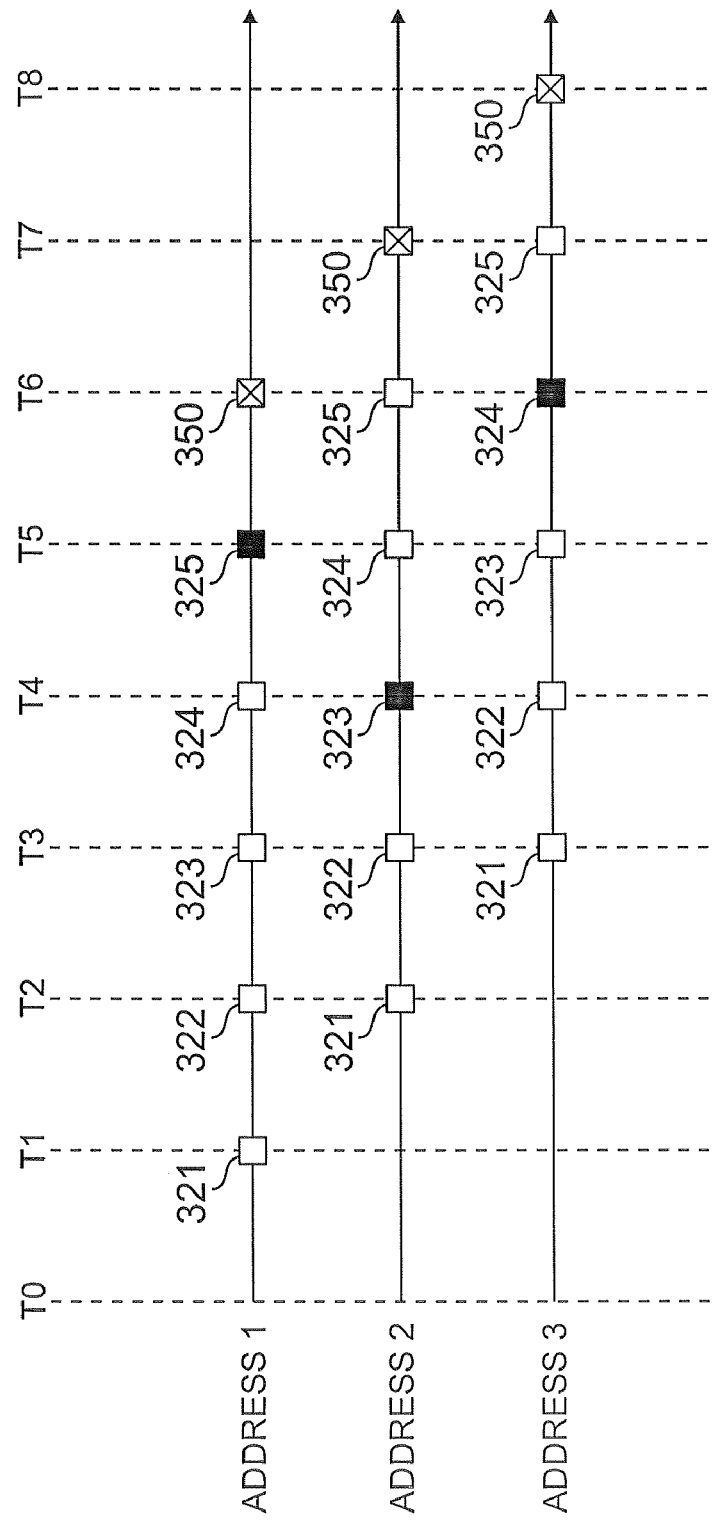
FIG. 4 is a timing diagram illustrating the operation of the trie-based pipelined routing table in FIG. 3.

FIG. 4 is a timing diagram illustrating the operation of the trie-based pipelined routing table in FIG. 3. Three addresses, Address 1, Address 2, and Address 3, are propagated through the pipeline stages of routing table 300. In an exemplary embodiment, it is assumed that SRAM circuits 321-325 and DRAM circuit 350 each have a 25 nanosecond propagation time. Thus, times T0-T8 are each spaced 25 nanoseconds apart. In FIG. 4, each black square indicates that a prefix match has occurred and that the output from the SRAM circuit is the final address in the routing tables in DRAM circuit 350.

At time T0=0, Address A1 is applied SRAM circuit 321 and at time T1=25 nanoseconds, an address pointer is output by SRAM circuit 321. The empty square indicates that a prefix match has not occurred (flag not set) for Address 1 and the address pointer from SRAM circuit 321 is used as an index into SRAM circuit 322. At time T2=50 nanoseconds, an address pointer is output by SRAM circuit 322. The empty square indicates that a prefix match has not occurred for Address 1 and the address pointer from SRAM circuit 322 is used as an index into SRAM circuit 323. At time T3=75 nanoseconds, an address pointer is output by SRAM circuit 323. The empty square indicates that a prefix match has not occurred for Address 1 and the address pointer from SRAM circuit 323 is used as an index into SRAM circuit 324. At time T4=100 nanoseconds, an address pointer is output by SRAM circuit 324. The empty square indicates that a prefix match has not occurred for Address 1 and the address pointer from SRAM circuit 324 is used as an index into SRAM circuit 325.

Finally, at time T5=125 nanoseconds, an address pointer is output by SRAM circuit 325. The black square indicates that a prefix match has occurred for Address 1 and the address pointer from SRAM circuit 325 is used as an index into DRAM circuit 350. Memory controller 340 detects that the flag from SRAM circuit 325 is set and causes memory interface to transfer the address pointer to DRAM circuit 350. At time T6=150 nanoseconds, DRAM circuit 350 outputs a destination address, indicated by a square containing an "X". It is assumed in the example that the delay time of memory interface 330 is negligibly small so that the delays of memory interface 330 and DRAM circuit 350 are collectively shown as 25 nanoseconds.

A similar process occurs for Address 2, except that Address 2 trails Address 1 by one SRAM stage (i.e., 25 nanoseconds) and a prefix match occurs at time T4, when SRAM circuit 323 outputs an address pointer with the flag set. Memory controller 340 detects that the flag from SRAM circuit 323 is set and causes memory interface 330 to retain the address pointer from SRAM circuit 323. It is noted that the Address 2 match occurs before the Address 1 match. However, memory controller 340 and memory interface 330 maintain the order of the address pointers for Address 1 and Address 2. Thus, memory interface 330 applies the address pointer from SRAM circuit 325 to DRAM circuit 350 at time T5 and applies the address pointer from SRAM circuit 323 to DRAM circuit 350 at time T6, one time slot (i.e., 25 nanoseconds) after time T5. DRAM circuit 350 outputs the destination address for Address 2 at time T7, indicated by a box containing an "X".

A similar process occurs for Address 3, except that Address 3 trails Address 2 by one SRAM stage (i.e., 25 nanoseconds) and a prefix match occurs at time T6, when SRAM circuit 324 outputs an address pointer with the flag set. Again, however memory controller 340 and memory interface 330 maintain the order to the address pointers for Address 3 and Address 2. Thus, memory interface 330 applies the address pointer from SRAM circuit 323 to DRAM circuit 350 at time T6 and applies the address pointer from SRAM circuit 324 to DRAM circuit 350 at time T7, one time slot (i.e., 25 nanoseconds) after time T6. DRAM circuit 350 outputs the destination address for Address 3 at time T8, indicated by a box containing an "X".

Since destination addresses emerge from DRAM circuit 350 every 25 nanoseconds, routing table 300 is capable of 40 million lookups per second. An OC-192c optical link requires 24 million lookups per second for IPv4, assuming 40 byte packets and subtracting the OC-192c and packet framing overhead. This will reduce for IPv6 due to larger minimum size packets. The extra time for IPv6 may be utilized for giving more time at each SRAM level. Thus, the present invention is very scalable.

When routing table 300 is updated, the following actions are necessary:

i) Port Reassignment—If an existing prefix is simply reassigned to a different output port, then a single DRAM write is required for each change. No changes are needed for the SRAM tables;
ii) New prefix insertion—Whenever a new prefix is inserted into the lookup table, the tables are rebuilt from scratch. The time required to do this is limited primarily by the time to write the table to DRAM circuit 350. For a one million entry table, the time required is about four (4) milliseconds. If this dead time is unacceptable, then two copies of DRAM circuit 350 and possibly SRAM circuit 321-325 may be needed; and
iii) Table Calculation—It is estimated to take about 100 milliseconds to calculate the routing (forwarding) table using a 250 MIPS processor.

The present invention is capable of providing line speed lookups for 1 Gbps and 10 Gbps interfaces. There is a trade-off between memory size (especially SRAM trie table storage) and the number of lookups that must be done for each data packet (i.e. trie depth). As noted above, the performance of SRAM circuits limits the amount of SRAM to about 200 Mbits. Due to relatively long trie table update times, two copies of the trie tables may be required—one to perform searches (lookups) while the other is updated. This limits the amount of SRAM available for each trie table to about 100 Mbits.

Additionally, SRAM and DRAM lookup rates limit the trie depth to about 32 stages. Thus, a degree 16 trie table is advantageous. With a requirement for one million forwarding table entries, a 1 Gbps Ethernet interface may be serviced by a degree 16 trie table, 30 Mbits of SRAM, and 240 Mbits of DRAM for IPv6. Achieving line rate lookups for 10 Gbps Ethernet or OC-192c interfaces requires hardware support in the form of pipelining the lookup stages.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a router, a lookup circuit for translating received addresses into destination addresses comprising:
M pipelined memory circuits for storing a trie table capable of translating a first received address into a first destination address, wherein said M memory circuits are pipelined such that a first portion of said first received address accesses an address table in a first memory circuit and an output of said first memory circuit and a second portion of said first received address accesses an address table in a second memory circuit.

2. The lookup circuit asset forth in claim 1, wherein said output of said first memory circuit comprises a first address pointer that indexes a start of said address table in said second memory circuit.

3. The lookup circuit as set forth in claim 1, wherein an output of said second memory circuit accesses an address table in a third memory circuit.

4. The lookup circuit as set forth in claim 3, wherein said output of said second memory circuit comprises a second address pointer that indexes a start of said address table in said third memory circuit.

5. The lookup circuit as set forth in claim 4, wherein said second address pointer and a third portion of said first received address access said address table in said third memory circuit.

6. The lookup circuit as set forth in claim 5, wherein address pointers output from said M pipelined memory circuits are selectively applied to a final memory circuit storing a routing table, said routing table comprising a plurality of destination addresses associated with said received addresses.

7. The lookup circuit as set forth in claim 6, further comprising a memory interface capable of selectively applying to said final memory circuit an address pointer associated with said first received address and an address pointer associated with a subsequently received address, such that said address pointer associated with said first received address is applied to said final memory circuit prior to said address pointer associated with said subsequently received address.

8. The lookup circuit as set forth in claim 7, wherein said M pipelined memory circuits comprise static random access memory (SRAM) circuits.

9. The lookup circuit as set forth in claim 8, wherein said final memory circuit comprises a dynamic random access memory (DRAM) circuit.

10. A router for interconnecting N interfacing peripheral devices, said router comprising:
    a switch fabric; and
    a plurality of routing nodes coupled to said switch fabric, each of said routing nodes comprising:
        a plurality of physical medium device (PMD) modules capable of transmitting data packets to and receiving data packets from selected ones of said N interfacing peripheral devices;
        an input-output processing (IOP) module coupled to said PMD modules and said switch fabric and capable of routing said data packets between said PMID modules and said switch fabric and between said PMD modules; and
        a lookup circuit associated with said IOP module for translating received addresses associated with said data packets into destination addresses, said lookup circuit comprising M pipelined memory circuits for storing a trie table capable of translating a first received address into a first destination address, wherein said M memory circuits are pipelined such that a first portion of said first received address and a second portion of said first received address accesses an address table in a first memory circuit and an output of said first memory circuit accesses an address table in a second memory circuit.

11. The router as set forth in claim 10, wherein said output of said first memory circuit comprises a first address pointer that indexes a start of said address table in said second memory circuit.

12. The router as set forth in claim 10, wherein an output of said second memory circuit accesses an address table in a third memory circuit.

13. The router as set forth in claim 12, wherein said output of said second memory circuit comprises a second address pointer that indexes a start of said address table in said third memory circuit.

14. The router as set forth in claim 13, wherein said second address pointer and a third portion of said first received address access said address table in said third memory circuit.

15. The router as set forth in claim 14, wherein address pointers output from said M pipelined memory circuits are selectively applied to a final memory circuit storing a routing table, said routing table comprising a plurality of destination addresses associated with said received addresses.

16. The router as set forth in claim 15, further comprising a memory interface capable of selectively applying to said final memory circuit an address pointer associated with said first received address and an address pointer associated with a subsequently received address, such that said address pointer associated with said first received address is applied to said final memory circuit prior to said address pointer associated with said subsequently received address.

17. The router as set forth in claim 16, wherein said M pipelined memory circuits comprise static random access memory (SRAM) circuits.

18. The router as set forth in claim 17, wherein said final memory circuit comprises a dynamic random access memory (DRAM) circuit.

19. A method for translating a first received address into a first destination address using M pipelined memory circuits that store a trie table, the method comprising the steps of:
    accessing an address table in a first memory circuit using a first portion of the first received address;
    outputting from the address table in the first memory circuit a first address pointer that indexes a start of an address table in a second memory circuit; and
    accessing the address table in the second memory circuit using the first address pointer and a second portion of the first received address.

20. The method as set forth in claim 19 further comprising the steps of:
    outputting from address table in the second memory circuit a second address pointer that indexes a start of an address table in a third memory circuit; and
    accessing the address table in the third memory circuit using the second address pointer and a third portion of the first received address.

* * * * *

UNITED STATES PATENT AND TRADEMARK OFFICE
CERTIFICATE OF CORRECTION

PATENT NO. : 7,702,882 B2  
APPLICATION NO. : 10/658977  
DATED : April 20, 2010  
INVENTOR(S) : Jack C. Wybenga et al.

Page 1 of 1

It is certified that error appears in the above-identified patent and that said Letters Patent is hereby corrected as shown below:

Column 10, claim 2, line 51, delete "asset" and replace with --as set--; and

Column 11, claim 10, line 31, delete "PMID" and replace with --PMD--.

Signed and Sealed this
Fifth Day of April, 2011

David J. Kappos
*Director of the United States Patent and Trademark Office*